United States Patent [19]

Gallo

[11] Patent Number: 4,776,602
[45] Date of Patent: Oct. 11, 1988

[54] THERMALLY CONDUCTIVE COMPOSITE GASKET

[75] Inventor: Paul E. Gallo, Berwyn, Ill.

[73] Assignee: Dana Corporation, Toledo, Ohio

[21] Appl. No.: 81,968

[22] Filed: Aug. 5, 1987

[51] Int. Cl.$^4$ ............................................. F16J 15/12
[52] U.S. Cl. ............................... 277/233; 277/235 B; 277/DIG. 6
[58] Field of Search ............... 277/235 B, 235 A, 233, 277/234, 901, DIG. 6

[56] References Cited

U.S. PATENT DOCUMENTS

| | | | |
|---|---|---|---|
| 1,863,521 | 6/1932 | Crane | 277/234 |
| 2,055,471 | 9/1936 | Balfe | |
| 2,711,334 | 6/1955 | Balfe | |
| 3,404,061 | 10/1968 | Shane et al. | |
| 3,532,349 | 10/1970 | Czernik | 277/235 B X |
| 3,668,036 | 6/1972 | Farnam | 277/235 B X |
| 3,679,218 | 7/1972 | Farnam | 277/233 |
| 3,784,212 | 1/1974 | Doerfling | 277/235 B X |
| 3,841,289 | 10/1974 | Meyers | 277/235 B X |
| 4,234,638 | 11/1980 | Yamazoe et al. | 277/235 B X |
| 4,285,527 | 8/1981 | Connely | 277/235 B |
| 4,325,559 | 4/1982 | Czernik et al. | 277/235 B |
| 4,333,975 | 6/1982 | Booth | 277/235 B X |
| 4,351,534 | 9/1982 | McDowell | 277/235 B |
| 4,465,287 | 8/1984 | Bindel et al. | 277/235 B |
| 4,477,094 | 10/1984 | Yamamoto et al. | 277/235 B |

FOREIGN PATENT DOCUMENTS 10503 3/1981 Japan ............................... 277/235 B

*Primary Examiner*—Allan N. Shoap
*Attorney, Agent, or Firm*—Frank McDonald

[57] ABSTRACT

A composite gasket is formed of a metal core and includes a compressible composition gasket facing material on both sides of the core. Intermediately of at least one facing and directly against the core is interposed a thermally conductive layer of material having a thermal conductivity greater than that of the metallic core material. The thermally conductive layer enhances the ability of the composite gasket to laterally transfer heat, thus avoiding hot spots in the combustion chamber regions of the gasket. In a preferred form, the thermal conductivity layer is comprised of an expanded graphite material. The compressible gasket facing material is made of a composite including clay, rubber, and aramid fiber.

10 Claims, 1 Drawing Sheet

THERMALLY CONDUCTIVE COMPOSITE GASKET

BACKGROUND OF THE INVENTION

This invention relates to durability of engine gaskets as utilized in cylinder head applications. More particularly, the invention relates to enhancement of thermal conductivity in gasket materials, with particular emphasis on conveyance of heat from hot spots for improvements in gasket longevity.

The demand for non-asbestos engine gaskets has created a major effort to develop facing materials which are both temperature durable, and cost effective to manufacture. Typically, non-asbestos composites include various bonding agents and filler constituents in order to enhance the physical strength properties of the facing material. Various impregnating agents have been employed in some of the composites for reducing permeability of the composite material and for enhancement of sealing characteristics under high temperature conditions. Such agents tend to be volatilized over a period of time, however, causing a breakdown in the composition integrity. Moreover, to the extent that the gasket may undergo a substantial density reduction due to loss of binder, filler, and other bonding agents, the sealing effectiveness begins to deteriorate almost immediately upon use of the gasket material.

Several efforts have thus been made to aid in the transmission of heat away from combustion opening areas and toward areas adjacent water coolant passages. One such attempt to increase lateral thermal conductivity has involved applying a plurality of heat-conductive foil strips to exterior surfaces of the composite facing material. This has been found effective in the prevention of localized hot-spots. However, some foil materials applied to the exterior surfaces of the facings may be incompatible with certain coating materials which are used as anit-stick and/or anti-fretting agents. In addition, utilization of such overlying thermally conductive materials has created problems with respect to surface damage during installation, particularly where graphite foil is used.

SUMMARY OF THE INVENTION

This invention provides a multi-layer thermally conductive engine gasket, which includes a metallic core having a pair of non-asbestos facings, one on each side of the core, and a thermally conductive material in direct contact with the core on at least one side thereof. The non-asbestos facings have substantially improved useful lives as a result of the underlying thermally conductive layer. In a preferred form, the conductive layer is comprised of an expanded graphite and both the conductive layer and the facing are mechanically clinched to the metallic core. The core material is low carbon steel, while the facing material is comprised of a composition including clay, rubber, and aramid fiber.

DETAILED DESCRIPTION OF THE PREFERRED EMBODIMENTS

Figure 1:
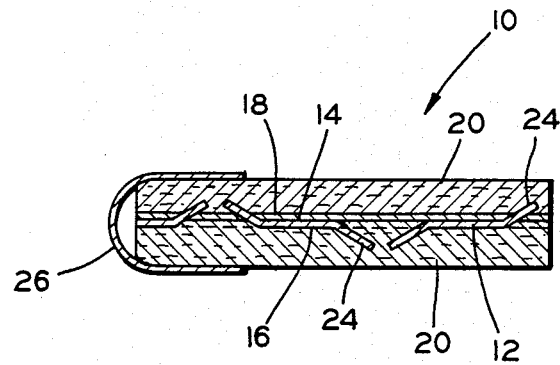
FIG. 1 is a fragmentary cross-sectional view of a composite gasket constructed in accordance with the present invention.

Referring to FIG. 1, a cylinder head gasket 10 is of a composite construction having an internal structural metallic core 12 including opposed planar upper and lower faces 14 and 16, respectively. A thermally conductive foil layer 18 is in direct contact with the upper planar face 14, as shown.

A pair of compressible composition gasket facing layers 20 and 22 are disposed on opposing sides of the metallic core 12 in the manner shown. A plurality of tangs 24 are created by perforations formed in the core 12 during its manufacture for the purpose of mechanically clinching the thermally conductive layer 18, as well as the facing layers 20 and 22, to the planar faces 14 and 16 of the core 12. In a preferred form, the layers are clinched together by being rolled through a set of roll flatteners, as will be appreciated by those skilled in this art. Such clinching has been found to be more effective and yet cheaper than the use of bonding adhesives for securing the various layers together.

Figure 2:
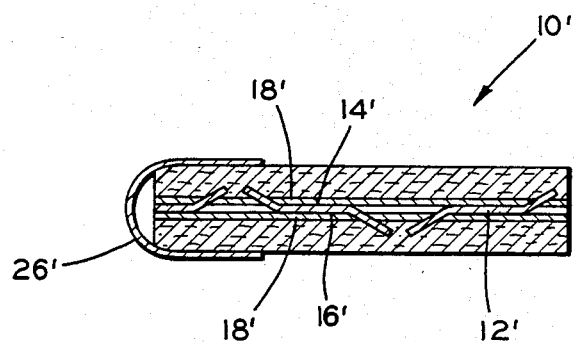
FIG. 2 is a fragmentary cross-sectional view of an alternate preferred embodiment of the same invention.

As noted, the gasket cross-sections depicted in FIG. 1 and FIG. 2 represent only partial views and include a combustion opening flange member 26, 26' which is formed of steel in the preferred embodiment. It will be appreciated, that the steel member 26, 26' is positioned to receive a great amount of heat to the extent that the member is designed to abut a combustion chamber region. To the extent that the latter represents a hot spot, it will be seen that the thermally conductive layer 18 will operate to conduct heat away from the combustion opening flange 26, 26' toward a cooler area, as would be represented by a cooling passage through the gasket (not shown).

Referring solely to FIG. 1, in a preferred form of the present invention, the thermally conductive layer is comprised of an expanded graphite material. In the same embodiment, the metallic core 12 is comprised of either a stainless or of a low carbon steel, preferrably tin plated. The core in the preferred embodiment has a thickness in the range of 6–12 thousandths of an inch, while the thermally conductive layer 18 has a thickness in the range of 7–10 thousandths of an inch. In the same preferred embodiment, the facings, which are of a composition including clay, rubber, and aramid fibers (of the class of polyamide fibers), are utilized in pairs, each facing having a preferred thickness of 20–25 thousandths of an inch.

Although expandable graphite has a thermal conductivity which in various forms is at least three times greater than that of low carbon steel, other materials may be utilized as thermally conductive layers 18, such as, for example, aluminum or copper. At the thickness ranges indicated, in an automotive combustion engine, the use of a graphite foil layer 18 was found to be extremely effective in the elimination of hot spots associated with the combustion opening areas of the gasket 10. Obviously, these thickness ranges will vary with application. The heat transfer mechanism has proved effective even though the thermally conductive layer underlies the facing. Thus, the multi-layer thermall conductive engine gasket 10 of the present invention provides a means wherein the use of silicon and/or teflon coatings may be employed notwithstanding the inclusion of a graphite layer within the gasket body. In the latter application, the graphite will never be in contact with the surface coatings of the gasket.

Referring now to FIG. 2, an alternate preferred embodiment is shown which employs a pair of thermally conductive layers 18', one bonded to the upper planar face 14' of the core 12', the other bonded to the lower planar face 16' of the core 12'. In all other respects, the composite gasket 10' of FIG. 2 is identical to that of FIG. 1.

It will be appreciated by those skilled in the art that placement of the thermally conductive layers as herein disclosed enhances conformability of the gasket to rough surfaces without integrity compromise or damage to conductive layers 18, 18'. Also, embedment tolerences relating to the flange 26, 26' become less critical since the conductive layers are now buried under the facing layers 20.

Although only two preferred embodiments have been detailed and described herein, numerous other embodiments are envisioned to fall within the spirit and scope of the following claims.

What is claimed is:

1. In a composite gasket including a pair of compressible composition facing layers, said composite gasket having a structural metallic core situated between said facing layers, said core having opposed planar faces; an improvement comprising means for increasing lateral thermal conductivity in said gasket, said means comprising a thermal layer positioned directly against at least one of said planar faces of said core, intermediately of said core and one of said facing layers, said thermal layer comprising a material having a thermal conductivity greater than that of said metallic core, all of said layers being mechanically clinched together.

2. The composite gasket of claim 1 wherein said thermal layer comprises an expanded graphite material.

3. The composite gasket of claim 2 wherein said metallic core is perforated and defines a plurality of tangs on both planar faces.

4. The composite gasket of claim 3 wherein said facing layers comprise a non-asbestos composite.

5. The composite gasket of claim 4 wherein said facing layers comprise a composite of clay, rubber, and aramid fiber.

6. The composite gasket of claim 1 wherein said thermal layer comprises an aluminum foil.

7. The composite gasket of claim 1 wherein said thermal layer comprises a copper foil.

8. The composite gasket of claim 1 wherein said metallic core comprises a low carbon steel having a thickness in the range of 6-12 thousandths of an inch.

9. The composite gasket of claim 1 wherein said thermal layer comprises a thickness in the range of 7-10 thousandths of an inch.

10. The composite gasket of claim 1 wherein each facing layer has a thickness in the range of 20-25 thousandths of an inch.

* * * * *